(12) United States Patent
Kuo

(10) Patent No.: US 8,520,198 B2
(45) Date of Patent: Aug. 27, 2013

(54) GONIOPHOTOMETER FOR MEASURING 3D LIGHT INTENSITY DISTRIBUTION OF LIGHT SOURCE

(75) Inventor: Hung-Pin Kuo, Taichung (TW)

(73) Assignee: B&M Optics Co., Ltd., Taichung (TW)

( * ) Notice: Subject to any disclaimer, the term of this patent is extended or adjusted under 35 U.S.C. 154(b) by 96 days.

(21) Appl. No.: 13/345,001

(22) Filed: Jan. 6, 2012

(65) Prior Publication Data

US 2012/0194820 A1 Aug. 2, 2012

(30) Foreign Application Priority Data

Jan. 27, 2011 (TW) .............................. 100103153 A

(51) Int. Cl.
*G01J 1/00* (2006.01)
*G01J 1/42* (2006.01)

(52) U.S. Cl.
USPC ............................ 356/121; 356/218; 356/226

(58) Field of Classification Search
USPC .......................................... 356/121, 213–226
See application file for complete search history.

(56) References Cited

U.S. PATENT DOCUMENTS

| | | | | |
|---|---|---|---|---|
| 5,949,534 A | * | 9/1999 | Guttman et al. | 356/121 |
| 7,800,745 B2 | * | 9/2010 | Pan | 356/121 |
| 7,973,917 B2 | * | 7/2011 | Liu et al. | 356/218 |
| 2008/0304049 A1 | * | 12/2008 | Pan | 356/73 |
| 2009/0185173 A1 | * | 7/2009 | Ashdown et al. | 356/121 |
| 2012/0081700 A1 | * | 4/2012 | Kuo | 356/222 |

FOREIGN PATENT DOCUMENTS

| | | |
|---|---|---|
| TW | I236530 B | 7/2005 |
| TW | M365473 U | 9/2009 |

\* cited by examiner

*Primary Examiner* — Hoa Pham
(74) *Attorney, Agent, or Firm* — Muncy, Geissler, Olds & Lowe, PLLC

(57) ABSTRACT

A goniophotometer includes an arc reflector; a holder for positioning a light source at the center of the arc reflector; a stationary detector substantially disposed at the center of the arc reflector and aimed at an arc reflective surface of the reflector; a driving device for rotating the holder with respect to the reflector and the detector about an axis of the light source; and a computing unit configured to convert a detection result of the detector into a measurement value.

10 Claims, 4 Drawing Sheets

GONIOPHOTOMETER FOR MEASURING 3D LIGHT INTENSITY DISTRIBUTION OF LIGHT SOURCE

BACKGROUND OF INVENTION

1. Field of Invention

This invention relates to a goniophotometer for measuring the three dimensional distribution of the luminous intensity of an optical source such as light emitting diode (LED), optical fiber, luminaire or the like.

2. Related Prior Art

Techniques are known in the art for measuring or characterizing the radiation pattern of a light source by utilizing a goniometer in combination of an optical detector. One such goniophotometeric measurement, as disclosed in Taiwan Patent No. I236530, is typically made by rotating the detector on a radial arm of the goniometer about the light source to be measured. The detector scans through angles and measures light output as a function of angle. However, such mechanical scanning apparatus often occupy a rather large volume due to the necessity of scanning at specified radii and also produces merely a two dimensional distribution of the luminous intensity of the light source.

In accordance with another known technique, a light source is mounted to a rotating goniometer which scans the optical beam from the light source across a detector that is fixed at one position. One such goniophotometer, as disclosed in Taiwan Patent No. M365473, incorporates a two-axis rotation mechanism to rotate the light source relative to the detector over a range of azimuth and elevation angles such that the detector can measure in three dimension the light output of the light source. However, this mechanism is typically large and cumbersome and does not allow for rapid positioning. Thus, a lengthy time for measurement would be required.

Accordingly, a goniophotometer and technique which overcome the aforementioned limitations of the prior art goniophotometer would constitute a significant advance in the art.

SUMMARY OF INVENTION

It is a primary object of the invention to provide a goniophotometer (or gonioradiometer) for measuring a three dimensional distribution of the luminous intensity of an optical source.

It is another object of the invention to provide a compact goniophotometer that is of low cost and simple construction. And this simple and compact goniophotometer advantageously facilitates rapid measurement rate.

In one embodiment, the present invention is directed to a goniophotometer comprising an arc reflector, a holder, a detector, a driving device and a computing unit. The holder is provided for positioning a light source at the arc center of the arc reflective surface of the reflector. The detector is substantially disposed at the arc center of the arc reflector and aimed at the arc reflective surface of the reflector. The driving device is provided for rotating the holder with respect to the reflector as well as the detector about an axis running through the light source in such a way that the detector can capture light reflected by the reflector in all directions from the light source. The computing unit is configured to convert a detection result of the detector into a measurement value for describing the light intensity distribution of the light source.

In another embodiment, a goniophotometer of this invention comprises all the elements of the aforementioned embodiment except that the driving device is configured for rotating the combination of the reflector and the detector, rather than the holder, about an axis running through the holder or the light source. In this way, after rotation of the reflector and the detector, light radiated from the light source in all directions can be captured by the detector via the reflector.

The construction of goniophotometer as described above is thus far largely conventional. According to the present invention, this configuration is advantageously utilized to determine 3D light intensity distribution of a light source in a fast and cost effective way.

BRIEF DESCRIPTION OF DRAWINGS

The invention will be more clearly understood after referring to the following detailed description read in conjunction with the drawings wherein.

DETAILED DESCRIPTION OF EMBODIMENTS

Figure 1:
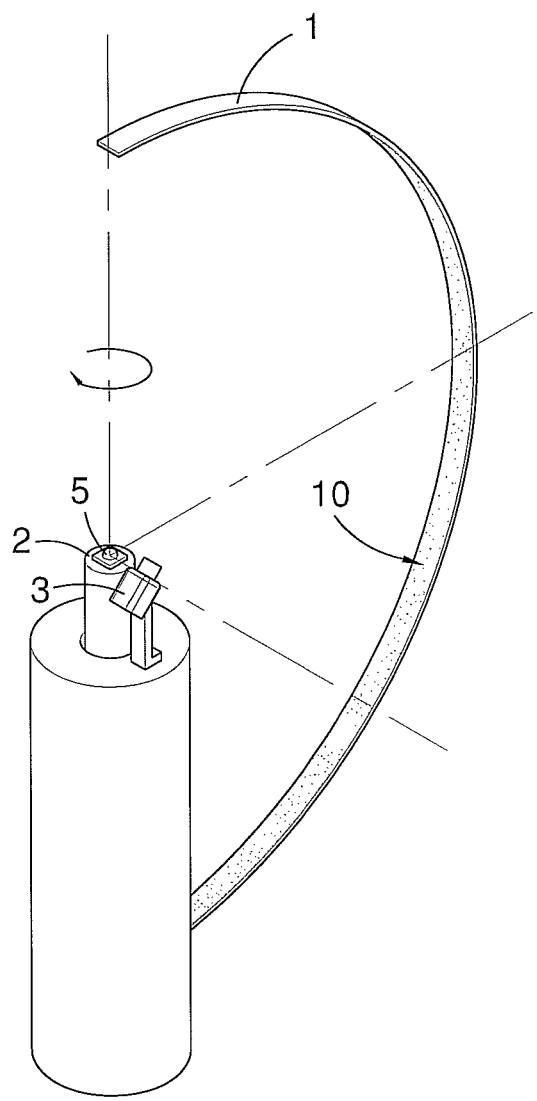
FIG. 1 is a perspective view of a goniophotometer according to a first embodiment of the present invention.
Figure 2:
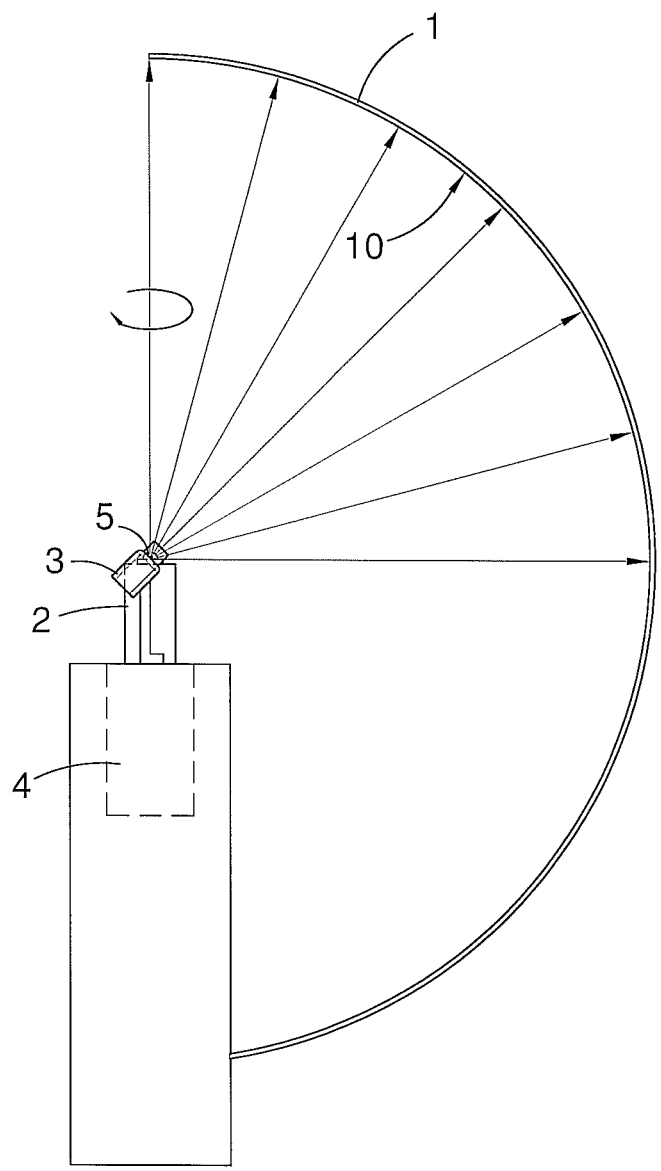
FIG. 2 is a cross section of the goniophotometer shown in FIG. 1.

Referring now to FIGS. 1 and 2, there is illustrated a goniophotometer 100 for measuring or characterizing the radiation pattern of a light source in accordance with a first embodiment of the present invention. The goniophotometer 100 includes an arc reflector 1, a holder 2, a detector 3, a driving device 4 (FIG. 2) and a computing unit (not shown). It is noted that the goniophotometer 100 is, but not limited to, a luminous intensity distribution meter.

As shown in FIG. 1, the reflector 1 has an arc reflective surface 10 that is arc-shaped in cross section. The arc reflective surface 10 of the reflector 1 is coated with a diffuse reflectance material, such as barium sulfate, for light reflection. The holder 5 is provided for positioning a light source, such as a LED, at the arc center of the arc reflective surface 10 of the reflector 1, as depicted in FIG. 1. In other words, every point on the arc reflective surface 10 of the reflector 1 is exactly the same distance from the center light source 5.

In close proximity to the holder 2, the detector 3 is substantially located at the arc center of the reflective surface 10 of the reflector 1 and aimed at the arc reflective surface 10 of the reflector 1. The detector 3 is configured to capture light reflected by the reflective surface 10 of the reflector 1. Preferably, the detector 3 is a linear image sensor, such as a linear CCD or CMOS image sensor. In general, the linear image sensor consists of an integrated circuit that contains an array of pixel sensors. Each pixel sensor consists of a photodiode (photosensitive unit), CCD or CMOS (transfer unit), and signal detection circuit (output unit). The photodiode converts light into electrons (charges) and stores them. The CCD transfers these electrons to the signal detection circuit. The signal detection circuit then converts electrons into electrical signals for further processing by the computing unit of the goniophotometer 100.

In this embodiment, the detector 3 is a linear CCD sensor and is coupled to the computing unit. The driving device 4 is a motor connected to the holder 2 for rotating the holder 2 with respect to the reflector 1 as well as the detector 3. In the course of measurement, the light source 5 on the holder 2 rotates in azimuth about the vertical axis passing through the light source 5 such that light emitted in all directions from the light source 5 will be projected, in turn, onto the stationary reflector 1 and further reflected by the latter toward the detector 3. That is, when the holder 2 rotates a full 360 degrees, the detector 3, which is located at the arc center, captures light emitted in each direction from the light source 5. The computing unit then calculates the spatial light intensity distribution of the light source based on a detection result of the detector 3. As such, although the reflector 1 and the detector 3 are stationary, the three dimensional light intensity distribution of the light source 5 can be easily measured with the rotation of the holder 2 on which the light source 5 is positioned.

Specifically, the light rays projected on the reflector 1 will be reflected to and captured by the linear array of pixel sensors of the detector 3. Each time the detector 3 detects the light projected on the arc reflective surface 10 at one azimuth angle of 0 degree for example, the detector 3 at the same instant detects all light rays on an arc line of the reflective surface 10 of the reflector 3 in the elevation angles ranged from 0 through 90 degrees. In a case where the detector 3 is a linear image sensor containing 4500 pixel sensors for scanning light rays within the elevation angles of 0 to 90 degrees, each pixel sensor detects light rays in the range of 0.02 degrees in elevation. In this way, the sensitivity of precision measurements is greatly enhanced.

Moreover, the detector 3 is configured to continuously detect the light rays emitted in all directions (i.e., at azimuth angles of 0 to 360 degrees) from the light source 5. In other words, all light rays emitted from the light source 5 in the 3D space can be collected by the detector 3, and therefore the computing unit can have a complete data from the detector 3 for precisely depicting the three dimensional light intensity distribution of the light source 5. In comparison with the prior art, the goniophotometer 100 provides a relatively precise 3D light intensity distribution of a light source in a cost and time effective manner.

Alternatively, the detector 3 may employ a two-dimensional image sensor having multiple linear sensors in parallel or arrays in place of a linear image sensor; however only one of the linear sensors will be needed by the computing unit. That is, the computing unit selects only a detection result from one of the linear sensors for conversion into the measurement value. That is to say, either linear image sensor or 2D image sensor can serve as the detector 3 for detecting a 3D light distribution.

Besides, an additional benefit of the goniophotometer 100 is space-saving since neither the reflector 1 nor the detector 3 of the goniophotometer 100 has to be rotated, but only the holder 2, for the purpose of rotating the light source 5, is needed to measure the 3D light intensity distribution of the light source 5.

Figure 3:
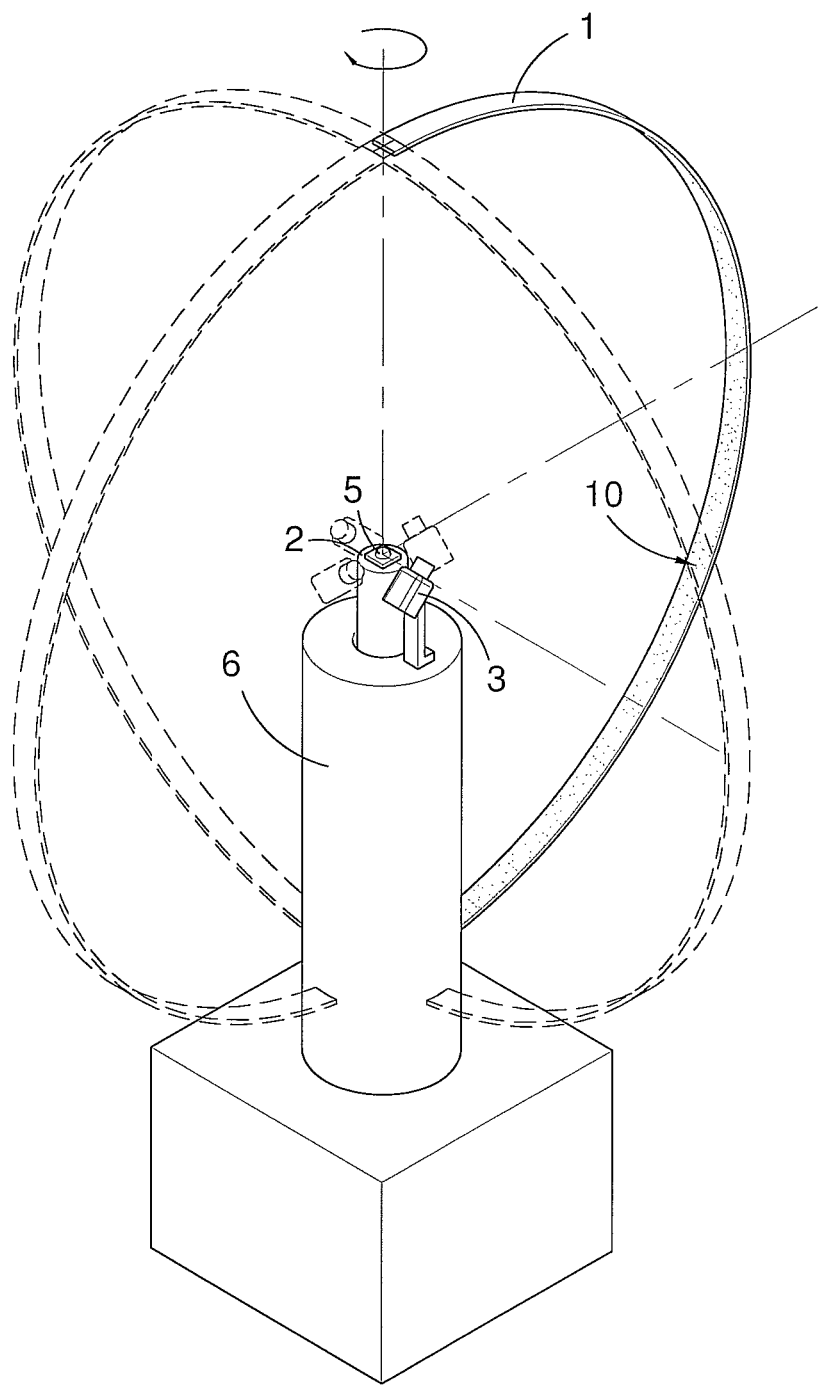
FIG. 3 is a perspective view of a goniophotometer according to a second embodiment of the present invention.
Figure 4:
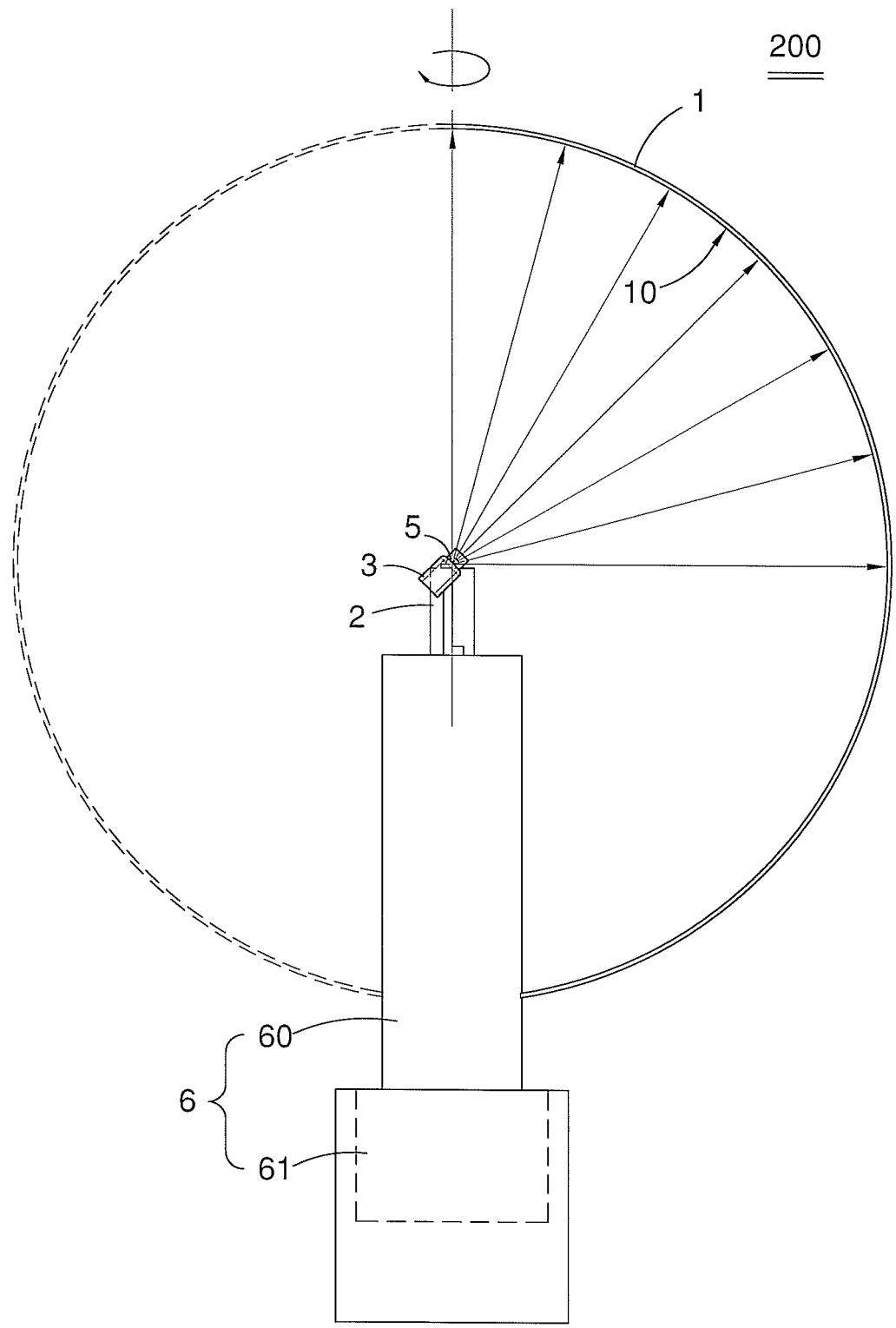
FIG. 4 is a cross section of the goniophotometer shown in FIG. 3.

Referring to FIGS. 3 and 4, there is illustrated a goniophotometer 200 in accordance with a second embodiment of the present invention. As shown in FIG. 3, the goniophotometer 200 is similar to a light intensity distribution meter 100 of the first embodiment, which includes an arc reflector 1, a holder 2, a detector 3, a driving device 6 and a computing unit (not shown), except that the driving device 6 is constructed for rotating a combination of the reflector 1 and the detector 3, rather than the holder 2. Specifically, the driving device 6 includes a support 60 and a motor 61 coupled to the support 60. The reflector 1 and the detector 3 are both mounted on the support 60 and indirectly driven by the motor 61 in such a way that the reflector 1 can rotate about an axis running though the holder 2 or the light source 5, and the detector 3 can rotate while always face the arc reflective surface 10 of the reflector 1. In this way, during rotation, the detector 3 can simultaneously detect the light reflected by the reflector 1 and therefore collect light rays in all direction from the light source 5.

As mentioned above, the detector 3 is a linear CCD image sensor and coupled to the computing unit. The driving device 6 is configured to drive the reflector 1 and the detector 3 to rotate with respect to the holder 2. Thus, in the course of measurement, rotation of the reflector 1 enables light emitted by the light source 5 in different azimuth angles to be projected, in turn, on the arc reflective surface 10 of the reflector 1. At the same instant, the detector 3, in rotating motion, captures the light rays reflected by the reflector 3 and transfers the detection result to the computing unit. Thus, even though the light source 5 on the holder 2 is stationary, the 3D light distribution can also be captured. It is noted again that the detector 3, in another example, may be a 2D image sensor containing a plurality of linear sensors. In that case, the computing unit will select only a detection result from one of the linear sensors for calculation so that either linear image sensor or 2D image sensor can be used for detecting a 3D light distribution.

The foregoing description is for purposes of illustration only and is not intended to limit the scope of the protection accorded this invention. The scope of protection is to be measured by the following claims, which should be interpreted as broadly as the inventive contribution permits.

The invention claimed is:

1. A goniophotometer, comprising:
   a reflector having an arc reflective surface;
   a holder for positioning a light source at the arc center of the arc reflective surface of the reflector;
   a stationary detector substantially disposed at the arc center of the arc reflective surface of the reflector and aimed at the arc reflective surface of the reflector;
   a driving device for rotating the holder with respect to the reflector and the detector about an axis of the light source; and
   a computing unit configured to convert a detection result of the detector into a measurement value.

2. The goniophotometer of claim 1, wherein the reflector is coated with a diffuse reflection material on the arc reflective surface.

3. The goniophotometer of claim 2, wherein the diffuse reflection material comprises barium sulfate.

4. The goniophotometer of claim 1, wherein the detector comprises a linear image sensor.

5. The goniophotometer of claim 1, wherein the detector comprises a two-dimensional image sensor having multiple linear sensors in parallel or arrays, and the computing unit selects only a detection result from one of the linear sensors for conversion into the measurement value.

6. A goniophotometer, comprising:
   a reflector having an arc reflective surface;
   a stationary holder for positioning a light source at the arc center of the arc reflective surface of the reflector;
   a rotatable detector substantially disposed at the arc center of the arc reflective surface of the reflector, aimed at the arc reflective surface of the reflector and configured to simultaneously rotate with the reflector;
   a driving device for rotating the reflector and the detector with respect to the holder about an axis running through the light source; and
   a computing unit configured to convert a detection result of the detector into a measurement value.

7. The goniophotometer of claim 6, wherein the reflector is coated with a diffuse reflection material on the arc reflective surface.

8. The goniophotometer of claim 7, wherein the diffuse reflection material comprises barium sulfate.

9. The goniophotometer of claim 6, wherein the detector comprises a linear image sensor.

10. The goniophotometer of claim 6, wherein the detector comprises a two-dimensional image sensor having multiple linear sensors in parallel or arrays, and the computing unit selects only a detection result from one of the linear sensors for conversion into the measurement value.

* * * * *